Feb. 8, 1927.
A. E. O. MUNSELL ET AL
1,617,024
COLOR CHART
Filed March 24, 1923    2 Sheets-Sheet 1
Fig. 1.
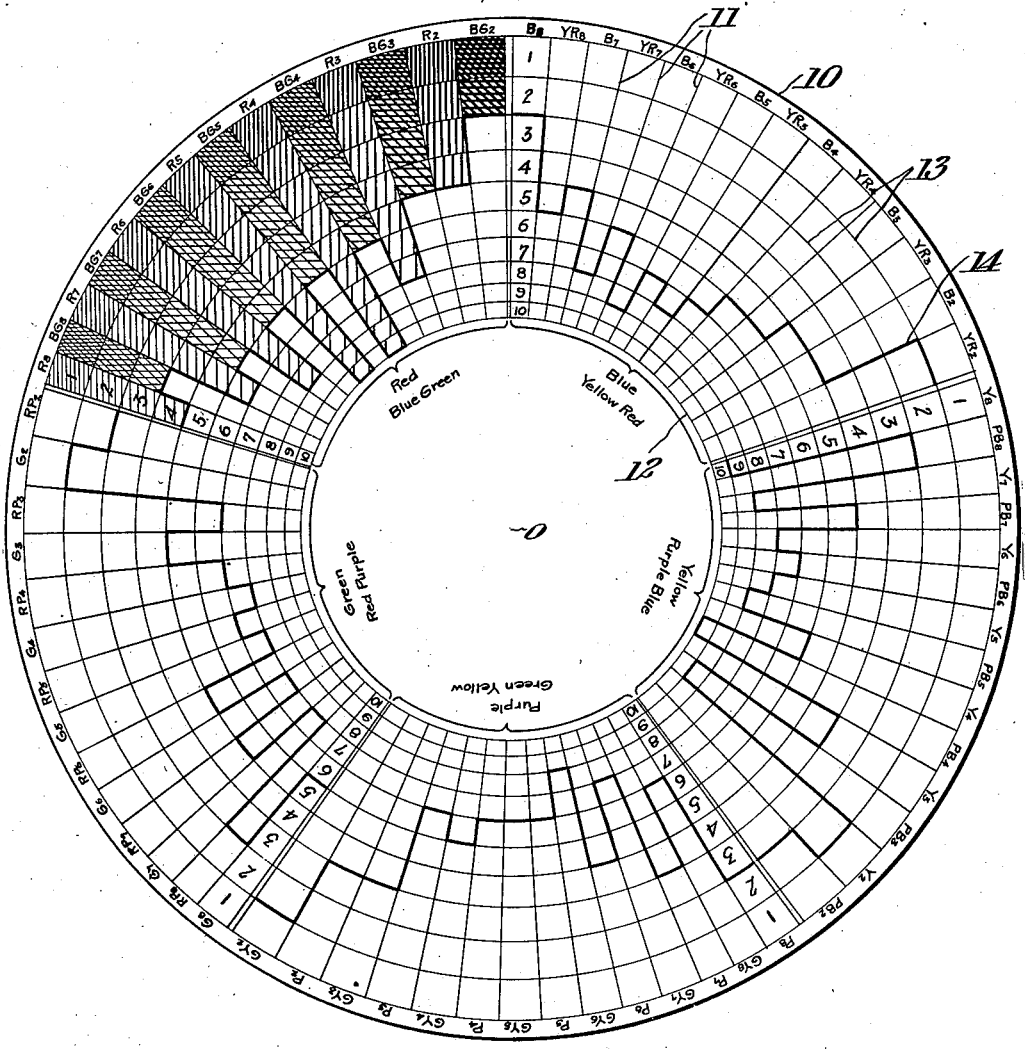
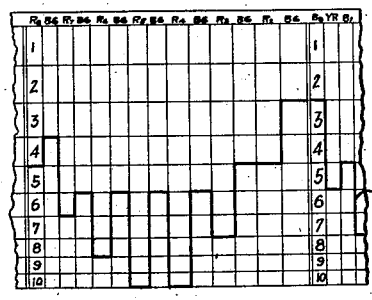
Fig. 2.
Inventors:
Alexander E. O. Munsell
Milton E. Bond
by Byrnes, Townsend & Beckenstein
their Attorneys.

Feb. 8, 1927. 1,617,024
A. E. O. MUNSELL ET AL
COLOR CHART
Filed March 24, 1923 2 Sheets-Sheet 2
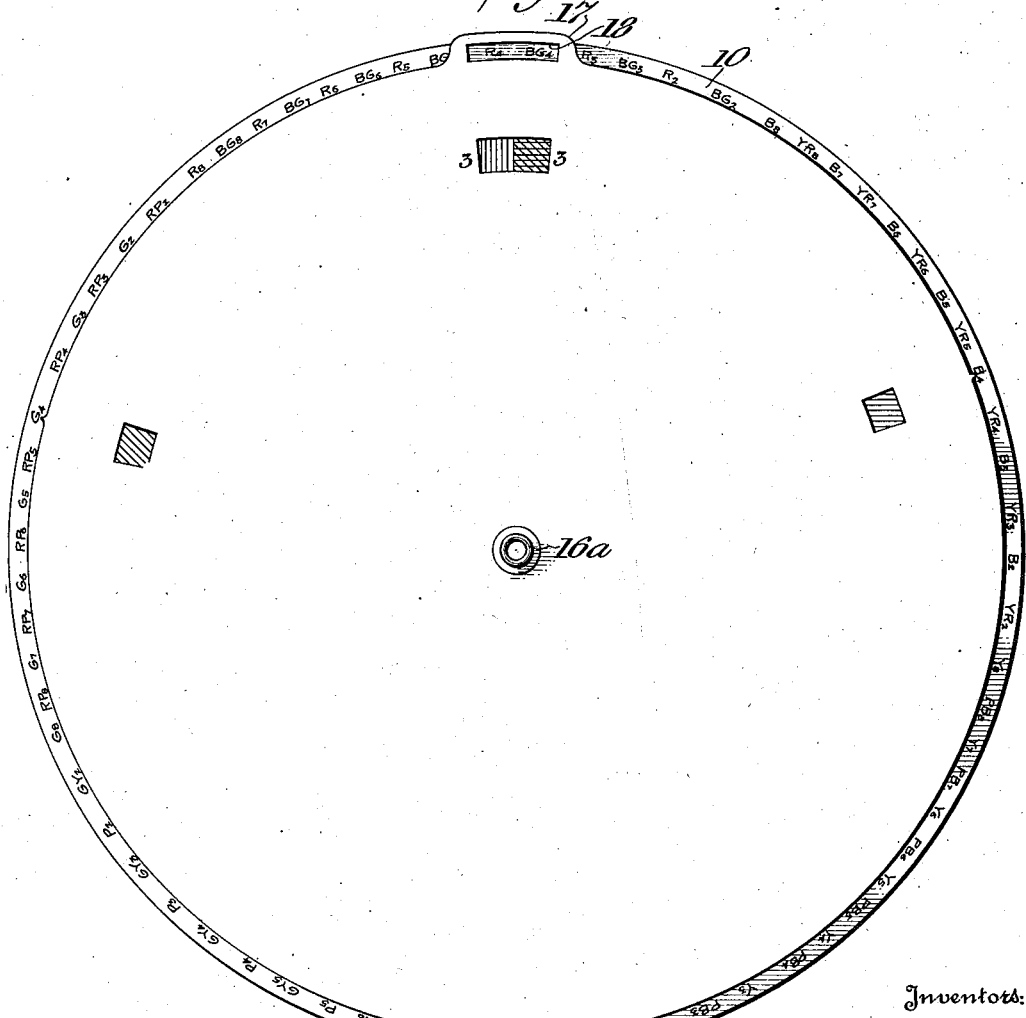

Patented Feb. 8, 1927.

1,617,024

UNITED STATES PATENT OFFICE.

ALEXANDER E. O. MUNSELL, OF BALTIMORE, MARYLAND, AND MILTON E. BOND, OF ROCHESTER, NEW YORK, ASSIGNORS TO MUNSELL COLOR COMPANY, INCORPORATED, OF NEW YORK, N. Y., A CORPORATION OF NEW YORK.

COLOR CHART.

Application filed March 24, 1923. Serial No. 627,505.

This invention relates generally to color charts.

Color charts have been resorted to in the past for educational as well as practical purposes. They serve to either exhibit known colors for selection or present different colors for comparison or establish orderly relationships or determine secondary and tertiary colors from primary colors.

Our invention has as its general object a color chart which contains on a single surface all known or conceivable colors and means for selectively correlating different colors represented on the chart.

It is a particular object to provide a simple means of attaining harmonious color combinations, based on certain fundamental laws of color harmony without needless expenditure of time and energy in the almost fruitless attempts according to the usual wasteful trial and error method.

This invention is essentially based upon the laws of color of A. H. Munsell as set forth in the Patent No. 824,374, and upon the truth of these laws.

According to the disclosure in the patent all known or conceivable colors have definite loci in a color sphere. The locus of each color is therefore a point in a polar coordinate or an orthotomic co-ordinate system.

Each color has three definite characteristics or indices, an index of value, an index of chroma and an index of hue.

It is the more specific object of this invention to present all colors known or conceivable within the disclosure of the Munsell patent on a single surface and to provide facilities for exhibiting any desired plurality of colors which are in an orderly, characteristic or peculiar correlationship in the theoretical color sphere suggested in the patent.

It is another special object to provide a color chart and means for exposing for comparison of the colors shown areas which are inversly proportional to their respective indices of chroma, or to their indices of value, or preferably both. The chart of Figure 1 being of this preferential form, the radii of the concentric circles increasing outwardly and the angle between the radial lines also increasing clockwise to an extent in each case sufficient to produce a chart of the preferential form.

Other more specific objects will appear from the description and the drawings accompanying it.

In the drawings,

Fig. 1 is a plan view of a color chart, represented on a reduced scale, indicating in a general way the principle of application;

Fig. 2 is a plan view showing more or less diagrammatically another from of chart;

Fig. 3 is an elevation of a chart similar to that shown in Fig. 1 and a mask for selectively exposing a plurality of colors correlated in some particular manner; and Fig. 4 is a plan view thereof.

Having reference to Fig. 1, the chart is subdivided by a large number of radial lines 11 into small sectors which preferably terminate outwardly in a circle 10 and inwardly a distance from the center 0 in a circle 12. For reasons to be more fully explained, the chart disclosed has five principal sectors containing each fourteen radial lines. There are also nine concentric circles 13 intermediate the periphery and the circle 12 which divide the chart into ten annular spaces. The radial lines 11 and the circles 13 by their intersections divide the whole area intermediate the peripheral circle 10 and the circle 12 into seven hundred small areas or facelets.

As is clearly indicated, in each of the five principal sectors the radial lines 11 are spaced increasingly farther apart in pairs in clockwise direction, i. e. the first and second, or the third and fourth, or the fifth and sixth facelets etc. within the same two adjacent circles are substantially the same.

The width of the facelets from circle 10 toward the circle 12 gradually decreases, as is self-evident.

As above mentioned, according to the Munsell system, colors are classified according to hue (dominant wave length), chroma (wave length purity) and value (total reflection of white light).

It has been found sufficient and practical so far to subdivide chroma into no more than ten degrees, and value into seven degrees in order to cover all distinguishable color sensations obtainable by the available pigments, in contradistinction to white, black and neutral gray.

As a rule, i. e. with the exception of yellow, the range of chroma is relatively small in the lighter as well as in the darker shades, and greatest near the middle. Only the range of chroma of red and purple blue comprises ten degrees. The stepped line 14 marks approximately one boundary of the ranges of the different colors.

It is understood that the stepped line 14, which is the boundary for the strongest chromas now reproducible, is purely temporary, since new pigments or dyes may be found which will occupy spaces situated outside of the stepped line 14 (centrally in relation to the stepped line 14); for example, in Fig. 1 the radial segment marked $R^s$ includes four facelets marked respectively 1, 2, 3 and 4. The fact that in this radial segment the facelets 1, 2, 3 and 4 are included within the stepped line 14 and facelets 5, 6, 7, 8, 9 and 10 lie outside of the stepped line 14 indicates that up to the present samples of red on the eighth level of "value" cannot be produced in pigment or dye form beyond the fourth step of "chroma." However in the future should pigments or dyes be discovered that will depict "chromas" stronger than step 4, the chroma steps outside of the stepped line 14 may be filled in. The other boundary circle 12 represents the limit of the sensations that can be experienced by the eye.

Of greatest importance in color study as well as in practical work is the correlation of complementary colors, as is well known. It is a general desideratum to have each color placed in juxtaposition with its complementary color so as to afford close observation side by side. For this reason we prefer to place adjacent to a series of colors of the same value the corresponding series of complementary colors. Thus each of the principal sectors is composed of seven radial rows of two complementary colors alternating with one another.

The colors are marked along the circle 10 and include red (R), yellow-red (YR), yellow (Y), green-yellow (GY), green (G), blue-green (BG), blue (B), purple-blue (PB), purple (P) and red-purple (RP). However, instead of arranging them according to their position in the order in which they follow each other in the spectrum, we place the complementary colors into one and the same principal sector in alternating rows as mentioned. Thus red and blue green (R) (BG) are in the first sector; blue and yellow-red (B) (YR) in the second sector; yellow and purple blue (Y) (PB) in the third sector; purple and green-yellow (P) (GY) in the fourth sector; and green and red-purple (G) (RP) in the fifth sector.

The indices of value as well as of chroma are arabic numbers. The indices of value vary along the circles and the indices of chromas vary along the radial lines. Each color is therefore identified by a letter at the end of each radial row and by its position along the circles, and along the radial lines. For the sake of illustration numerals are marked on the facelets to indicate the arrangement. The first radial row at the left in each principal sector includes the range of chroma of the highest value of a color. The third, fifth, etc, rows contain ranges of chroma of decreasingly smaller values. The second, fourth, etc. rows contain the corresponding ranges of chroma of the complementary color. Higher numbers mean a higher index. Thus the number "8" represents the highest value, and the number "10" signifies the highest chroma. The numbers "1" on the other hand denote the lowest value and the lowest chroma.

The significance of the arrangement described is as follows:

The arrangement has the distinctive advantage that every degree of chroma of every hue is contiguous and in closest juxtaposition to the like degree of chroma of its opposite or complementary hue on the same value level.

It is generally understood that higher values of a color have a greater stimulating effect than lower values. The lighter the tint, the greater is the sensation of light, and the darker the shade, the smaller is the light effect. Similarly the purer the color, i. e. the higher the chroma, the greater is the stimulating effect.

By increasing in each principal sector the areas of the facelets from left to right, the higher values cover a smaller area than the lower values. Similarly the areas of higher chroma are smaller than the areas of lower chroma. By the proper selection of the distance between the center 0 and the circle 12, and between the two circles 10 and 12, and by properly grading the distances between radial lines along the circles, the stimulating effect of any two colored areas may be substantially equalized. This effect is of considerable importance for the purpose of making comparisons as to harmony or pleasing effect of combinations. The predominant effect of one color upon the retina more or less drowns the effect of the other color. The greater the contrast in regard to value and chroma, the more overpowering is the effect of the one at the expense of the other and the more one-sided and unreliable is the comparison. By the arrangement proposed conditions are reduced, so to speak, to standard, and permit comparison under ideal conditions.

The arrangement has another important practical result. Aside from facilitating a reliable comparison, it affords in itself a measure of relative areas that may be safely brought into combination to produce a pleasing effect. For the same reason that a relatively smaller area of a stronger color (high value, high chroma, or both) is necessary to balance with a larger area of a weaker color, for the same reason is it advisable to use smaller areas of a stronger color with larger areas of a weaker color, preferably in the proportion of their combined indices, in practical application.

Another advantage of the arrangement is the position of a color relatively close to the two components of its complementary color. Thus the sector containing "yellow" is flanked on one side by "blue" and on the other side by "purple", which are the components of "purple-blue", this latter being the complementary of "yellow" and in juxtaposition therewith, as previously explained. The close spatial relation of a color, its complementary, and its split complements thus brings conveniently before the eye all or any of those colors which are most closely correlated as regards color harmony and the color-esthetic sense.

In practice we propose to use suitable masks, as indicated, Figs. 3 and 4, for selectively exhibiting any plurality of individual colors, or series of colors, while excluding the other colors from view. We are fully aware that masks are generally not new, and we do not claim any novelty except in so far as masks serve to carry out the object of the specific invention described.

As indicated in Figs. 3 and 4, the mask 15 is preferably slightly smaller than the chart, and is pivotally mounted thereon. While there is considerable latitude in regard to the detail construction, we prefer to permanently mount a pivot 16 on the chart and provide a bearing, such as a simple eyelet 16ª, on the mask.

The mask is shown as having two adjacent openings, and two openings spaced therefrom. In the particular instance the two adjacent openings expose R 4/3 and BG 4/3, while the other openings expose G 4/3 and B 4/3, respectively. A finger piece 17 for revolving the mask has an aperture 18 exposing the letters which indicate the hues and the index of value, while the chroma is marked adjacent the exposure openings.

We have illustrated a simple and almost primitive form of mask to illustrate the general operation. A plurality of masks and in fact a large number of masks may be provided for selectively exposing particular colors desired to be compared or for exposing for educational purposes a plurality of colors correlated in an orderly way by laws of color physics. We contemplate particularly the use of a plurality of masks for illustrating color relations which are based on the Munsell conception disclosed in the Patent No. 824,374, but have not been adequately demonstrated therein. By means of special masks it is possible to simultaneously expose all colors which would be exposed by a section through the spherical color solid assumed in the patent. It is thus possible to expose all colors obtained by any of a plurality of horizontal sections, vertical sections, oblique sections, or other sections determining particular or peculiar relationships.

We are, of course, fully aware, that within the scope of mechanical skill and the light of the state of the art masks may be provided which admit of changing, shifting or otherwise adjusting parts on the mask to expose different colors or different relations by means of the same mask. Our invention, however, is not concerned so much with the numerous detail constructions feasible within its scope as rather with the broader aspect of opening up to the public, teachers, pupils and artists the broadest vista into the color realm, and for developing and systematically training the color-esthetic sense which has strangely not been developed in the masses since and notwithstanding the classic times of old Greece, or the period of Renaissance which did not react upon the general public.

In Fig. 2 we have diagrammatically indicated that the colors may be linearly arranged instead of in a circle. In fact the single surface for exhibiting the colors may be any plane surface or a cylindrical, conical or spherical or any other symmetrically curved surface upon which a mask may be moved to expose any color or plurality of colors desired.

The description of the stepped line 14 in Figure 1 explains the heavy stepped line in Figure 2, with the understanding that the facelets in Figure 1 situated outside the stepped line should be referred to on Figure 2 as situated below the stepped line 14.

In the foregoing, the subdivision of value into seven steps or degrees, and of chroma into at most ten steps, has been adopted as best suiting the sensitiveness of the eye. However, in principle any greater or smaller number of steps may be adopted. The selection of the number of steps, the size of the chart is only a matter of relativity.

In regard to the practical aspect of the color chart, it is intended to simplify certain operations of color synthesis which are based upon well known laws.

The hues are marked along line 10 and each hue may advantageously carry its index of value as shown in Fig. 1. Each mask may advantageously mark the index of chroma of an exposed color. Therefore, then each color exposed is identified by its hue, chroma and value.

It is often necessary to find the quantities of two colors to produce a balance in neutral gray. The chart indicates at once the respective quantities necessary. In case of complementary colors of the same chroma and the same value, the quantities are equal, as is well understood. This is also indicated on the chart, since the respective products of the index of chroma and the index of value are equal. Suppose that Y 8/9 i. e. yellow having the index 8 of value and the index 9 of chroma, is to be mixed with PB 4/10 i. e. purple-blue having the index 4 of value and the index 10 of chroma, then the products are as 72:40. According to the well known "inverse proportion law" of color mixtures 40 parts by weight of yellow must be mixed with 72 parts by weight of purple-blue to produce neutral gray.

There are numerous modifications of which the arrangement is susceptible. Obviously the relative angular arrangement of the colors may be changed in various ways without fundamentally deviating from the principles and the objects of the invention.

We are also fully aware that areas of different colors may be exposed in inverse proportion of their respective chromas or values, or both, in other ways than illustrated. We therefore do not intend to be limited to the particular way shown and described.

We claim:

1. A color chart bearing colors of different chroma and means for presenting different color areas which differ inversely as their respective chromas differ.

2. A color chart bearing colors of different value and means for presenting different color areas which differ inversely as their respective values differ.

3. A color chart bearing colors of different value and chroma and means for presenting different color areas which differ inversely as their respective values and chromas differ.

4. A color chart bearing colors of different hue, chroma and value and means for presenting different color areas which differ inversely as their respective values and chromas differ.

5. A color chart comprising a plurality of juxtaposed rows of areas bearing the colors of two complementary hues graduated according to value and chroma, the arrangement being such that the opposite colors of like value and chroma lie adjacent each other.

6. A color chart comprising a plurality of juxtaposed rows of areas bearing the colors of two complementary hues graduated according to value and chroma, the arrangement being such that alternate rows bear colors of the same hue but of progressively varying value and that the colors in each row progressively vary in chroma.

7. A color chart comprising a plurality of juxtaposed rows of areas bearing the colors of two complementary hues graduated according to value and chroma, the areas varying in size in inverse proportion to the value and chroma of the colors they bear.

8. Arrangement according to claim 7 in which the opposite colors of like value and chroma lie adjacent each other.

9. A color chart containing colors corresponding to the different colors of the spectrum and comprising a plurality of sections bearing each a principal color and the color complementary thereto, graduated according to value and chroma.

10. A color chart containing colors corresponding to the different colors of the spectrum and comprising a plurality of sections each bearing a principal color and the color complementary thereto, graduated according to value and chroma and means for exposing of a plurality of color areas which differ inversely as their respective values and chromas differ.

11. A color chart comprising five sections each bearing a principal color and the color complementary thereto, each section having a plurality of rows of alternately opposite hue and of progressively varying value, and each row bearing colors of progressively varying chroma.

12. A color chart containing colors corresponding to the different colors of the spectrum and comprising a plurality of sections bearing each a principal color and the color complementary thereto, each section having a plurality of rows of alternately opposite hue and of progressively varying value and each row bearing colors of progressively varying chroma, and means for exposing of a plurality of color areas which differ inversely as their respective values and chromas differ.

In testimony whereof, we affix our signatures.

ALEXANDER E. O. MUNSELL.
MILTON E. BOND.